(12) United States Patent
Hosaka et al.

(10) Patent No.: US 7,883,142 B2
(45) Date of Patent: Feb. 8, 2011

(54) VEHICULAR UPPER-PART STRUCTURE

(75) Inventors: Nobuo Hosaka, Wako (JP); Kazuki Maeshima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/597,979

(22) PCT Filed: Jul. 15, 2008

(86) PCT No.: PCT/JP2008/063092

§ 371 (c)(1),
(2), (4) Date: Oct. 28, 2009

(87) PCT Pub. No.: WO2009/019970

PCT Pub. Date: Feb. 12, 2009

(65) Prior Publication Data

US 2010/0140982 A1    Jun. 10, 2010

(30) Foreign Application Priority Data

Aug. 6, 2007    (JP) .............................. 2007-204293

(51) Int. Cl.
*B62D 25/06* (2006.01)
(52) U.S. Cl. .................. 296/210; 296/191; 296/193.12
(58) Field of Classification Search ................. 296/102, 296/192, 193.03, 193.04, 193.12, 210
See application file for complete search history.

(56) References Cited

U.S. PATENT DOCUMENTS

| 4,618,181 | A | * | 10/1986 | Tokuda et al. ............... 296/210 |
| 4,634,173 | A | * | 1/1987 | Aonuma et al. ............. 296/210 |
| 5,318,338 | A | * | 6/1994 | Ikeda .......................... 296/210 |
| 6,328,376 | B2 | * | 12/2001 | Son ............................. 296/210 |
| 2001/0004161 | A1 | * | 6/2001 | Son ............................. 296/210 |
| 2008/0030050 | A1 | * | 2/2008 | Chen et al. .................. 296/210 |
| 2008/0129087 | A1 | * | 6/2008 | Hallik ......................... 296/210 |

FOREIGN PATENT DOCUMENTS

JP    2005-153649    6/2005

* cited by examiner

*Primary Examiner*—Lori L Lyjak
(74) *Attorney, Agent, or Firm*—Rankin, Hill & Clark LLP

(57) ABSTRACT

Vehicular upper-part structure includes left and right side roof rails located on opposite sides of a roof of a vehicle compartment, and a roof panel and roof arch member each joined at their opposite end portions to the side roof rails. Each of the side roof rails includes: an outer member; an inner member extending along the outer member, the inner member having a first vertical wall portion and a welding flange portion formed integrally with the first vertical wall portion, one of the opposite end portions of the roof arch member being joined to the welding flange portion by welding; and a second vertical wall portion formed by a stay member that is joined at its one end portion to the welding flange portion and supports a roof panel joint section having the roof panel joined thereto by welding.

4 Claims, 13 Drawing Sheets

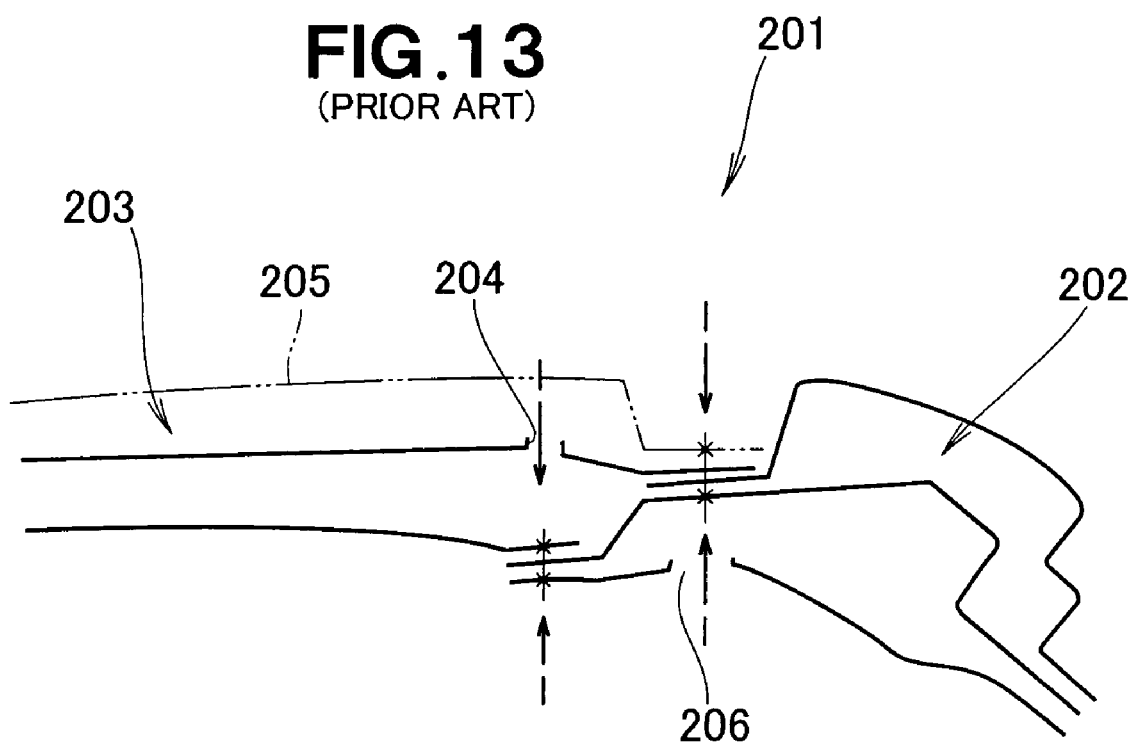

VEHICULAR UPPER-PART STRUCTURE

TECHNICAL FIELD

The present invention relates to an improved upper-part structure for use in vehicle roofs.

BACKGROUND ART

In general, roofs of vehicles comprise a roof panel formed of a thin plate and fixed to a framework. An example vehicular roof structure is know from JP 2005-153649 A and schematically illustrated in FIG. 13 hereof.

In FIG. 13, a roof structure 201 has a hole 204 for insertion therein an electrode for spot-welding a center roof rail 203 to a side roof rail 202 and a hole 206 for insertion therein an electrode for spot-welding a roof panel 205 to the side roof rail 202. With the center roof rail 203 of a closed sectional shape spot-welded to the side roof rail 202, the roof structure 201 can increase mechanical strength of a vehicle body against lateral collision. However, the disclosed roof structure 201 can not achieve a desired increased mechanical strength due to the provision of the electrode-inserting holes 204 and 206.

DISCLOSURE OF THE INVENTION

It is therefore an object of the present invention to provide an improved upper-part structure of a vehicle which can achieve an increased mechanical strength, stabilized welding and reduced variation in welded position.

In order to accomplish the above-mentioned object, the present invention provides an improved vehicular upper-part structure which includes left and right side roof rails located on opposite sides of a roof of a vehicle compartment and a roof panel and roof arch member each joined at their opposite end portions to the side roof rails. Each the side roof rails includes: an outer member; an inner member extending along the outer member, the inner member having a first vertical wall portion and a welding flange portion formed integrally with the first vertical wall portion, one of the opposite end portions of the roof arch member being joined by welding to the welding flange portion; and a second vertical wall portion in the form of a stay member that is joined at its one end portion to the welding flange portion and supports a roof panel joint section having one of the opposite portions of the roof panel joined thereto by welding.

Each of the side roof rails has the first vertical wall portion and the welding flange portion formed integrally with the first vertical wall portion. Thus, when the roof arch member is to be joined at each of the opposite end portions to one of the side roof rails by spot-welding with one electrode pressed against mutually overlapping portions of the roof arch member and side roof rail, i.e. the end portion of the arch member and the welding flange portion of the side roof rail (instead of the mutually-overlapping portions being sandwiched between a pair of electrodes), the welding flange portion is supported by the first vertical wall portion located substantially immediately under the one electrode, so that it is possible to prevent deformation of the end portion of the arch member and the welding flange portion of the side roof rail. As a result, it is possible to increase the strength of the inventive vehicular upper-part structure.

Each of the side roof rails further has also the second vertical wall portion in the form of the stay member that is joined at its one end portion to the aforementioned welding flange portion and supports the roof panel joint section having the roof panel joined thereto. Thus, when the roof panel is to be joined at each of its welding edge flange portions to one of the side roof rails by spot-welding with one electrode pressed against mutually overlapping portions of the roof panel and side roof rail, i.e. the welding edge flange portion of the arch member and the welding flange portion of the side roof rail (instead of the mutually-overlapping portions being sandwiched between a pair of electrodes), the welding flange portion is supported by the second vertical wall portion located substantially immediately under the one electrode, so that it is possible to prevent deformation of the welding edge flange portion of the roof panel and the welding flange portion of the side roof rail. As a result, it is possible to increase the strength of the inventive vehicular upper-part structure.

Further, because the inventive vehicular upper-part structure can prevent the deformation by means of the first and second vertical wall portions as noted above, it permits the necessary welding with the electrode and flange portions (including the end portions) held in reliable close contact with each other, which can advantageously achieve stabilization of the welding and reduce undesired variation in welded position.

The first vertical wall bears a load caused as the roof panel is joined to the side roof rail, and the second vertical wall bears a load caused as a roof side panel is joined to the side roof rail.

In an embodiment, the vehicular upper-part structure further includes, on each of the opposite sides of the roof, an intersecting section where a front pillar, the rood side rail and the roof arch member intersect one another.

BRIEF DESCRIPTION OF THE DRAWINGS

FIG. 13 is a view illustrating a conventionally-known technique.

BEST MODE FOR CARRYING OUT THE INVENTION

Figure 1:
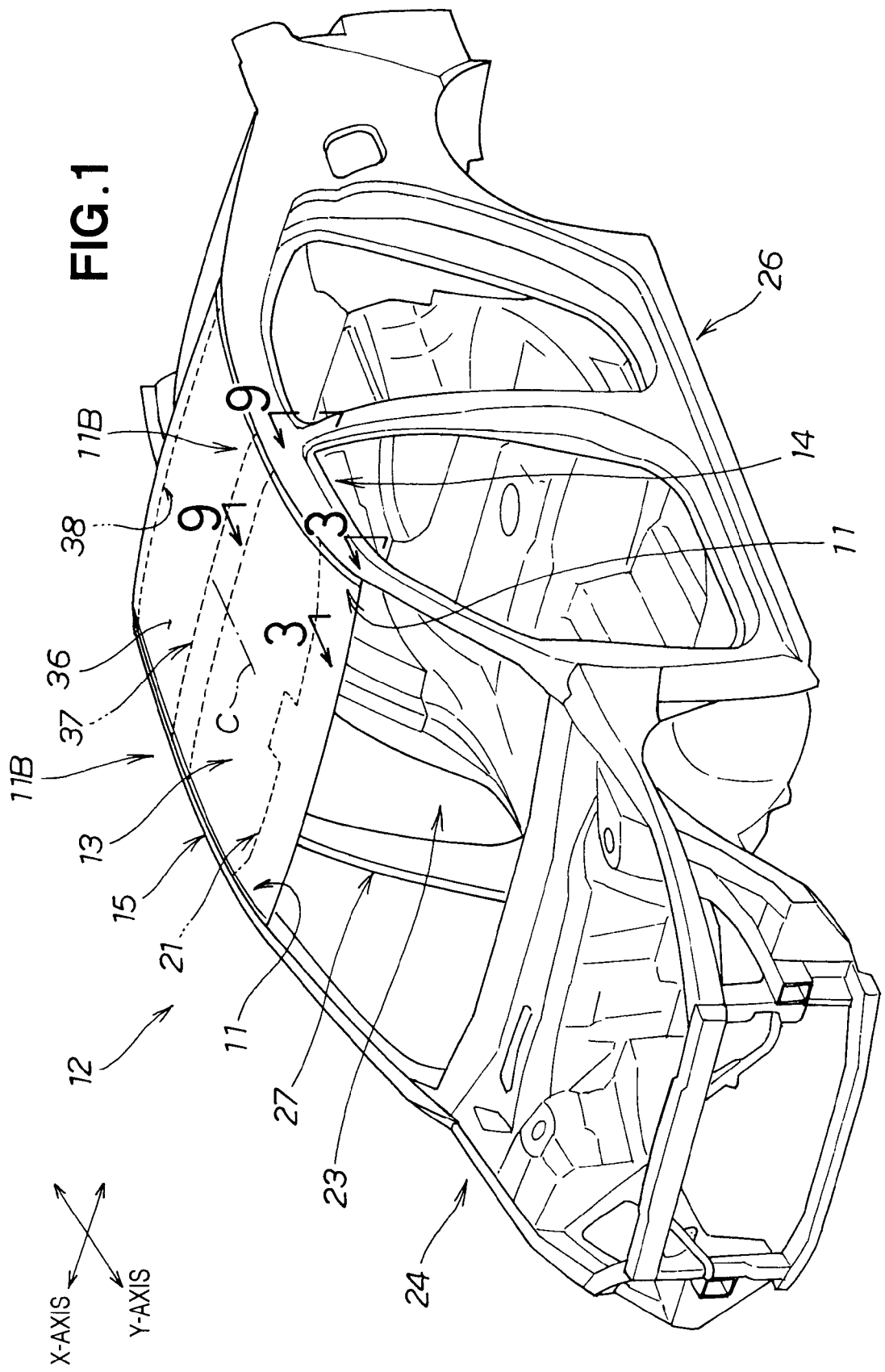
FIG. 1 is a perspective view of a roof of a vehicle which employs a first embodiment of an upper-part structure of a vehicle (i.e., vehicular upper-part structure) of the present invention.
Figure 2:
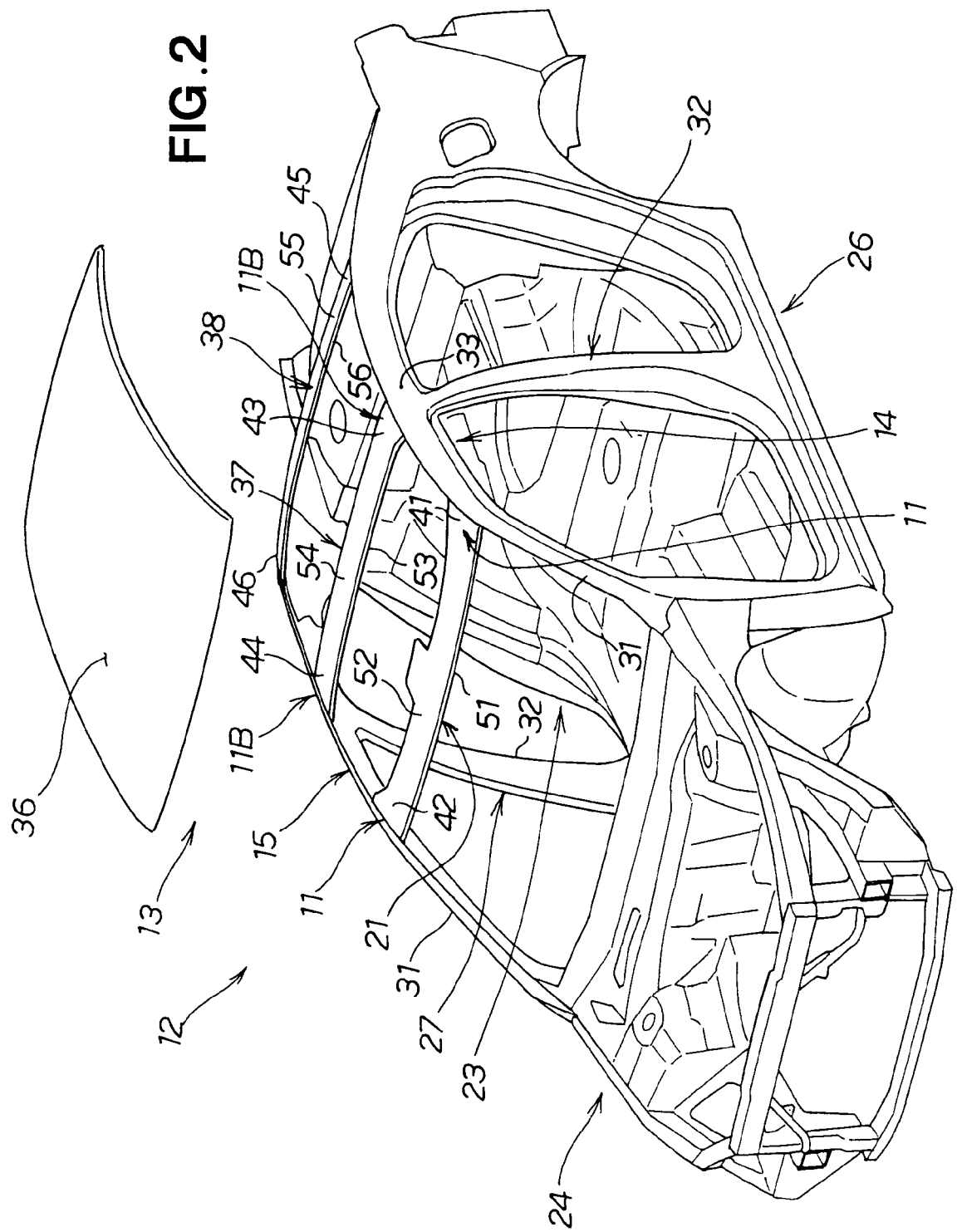
FIG. 2 is an exploded perspective view of the vehicle roof employing the vehicular upper-part structure.

Reference is now made to FIG. 1 showing in perspective a roof 13 of a vehicle 12 which employs, in a front region thereof, a first embodiment of a vehicular upper-part structure of the present invention, and to FIG. 2 showing in exploded perspective the vehicle roof.

The vehicular upper-part structure 11 comprises left and right side roof rails 14 and 15 disposed on left and right sides of the roof 13 of a vehicle compartment 23, and a front roof rail 21 that is one of a plurality of roof arch members fixed at their opposite end portions to the left and right side roof rails 14 and 15. The roof arch members are front roof rail 21, roof bow 37 and rear roof rail 38.

The vehicle 12 includes the compartment 23 and a body 24. The vehicle body 24 includes left and right side bodies 26 and 27 that constitute left and right side walls of the vehicle compartment 23, and the roof 13 that constitutes an upper wall of the vehicle compartment 23. The vehicle 12 is symmetrical about a longitudinal centerline C, i.e. centerline extending across a width (X axis) of the vehicle 12. The following paragraphs mainly describe a left half of the vehicle 12 because a right half of the vehicle 12 is generally identical in construction to the left half.

The left side body 26 includes a front pillar 31, a center pillar 32, and an outer section 33 of the left side roof rail 14.

The roof 13 includes a roof panel 36, the left side roof rail 14, the right side roof rail 15, and the front roof rail 21, roof bow 37 and rear roof rail 38 which are the roof arch members.

The front roof rail 21 has a left end portion 41 joined to the left side roof rail 14, and a right end portion 42 joined to the right side roof rail 15. The roof bow 37 has a left end portion 43 joined to the left side roof rail 14, and a right end portion 44 joined to the right side roof rail 15. Further, the rear roof rail 38 has a left end portion 45 joined to the left side roof rail 14, and a right end portion 46 joined to the right side roof rail 15.

The front roof rail 21 includes a first inner channel-shaped member 51, and a first outer channel-shaped member 52 joined to the first inner channel-shaped member 51. The roof bow 37 includes a second inner channel-shaped member 53, and a second outer channel-shaped member 54 joined to the second inner channel-shaped member 53. The rear roof rail 38 includes a third inner channel-shaped member 55, and a third outer channel-shaped member 56 joined to the third inner channel-shaped member 56.

Figure 3:
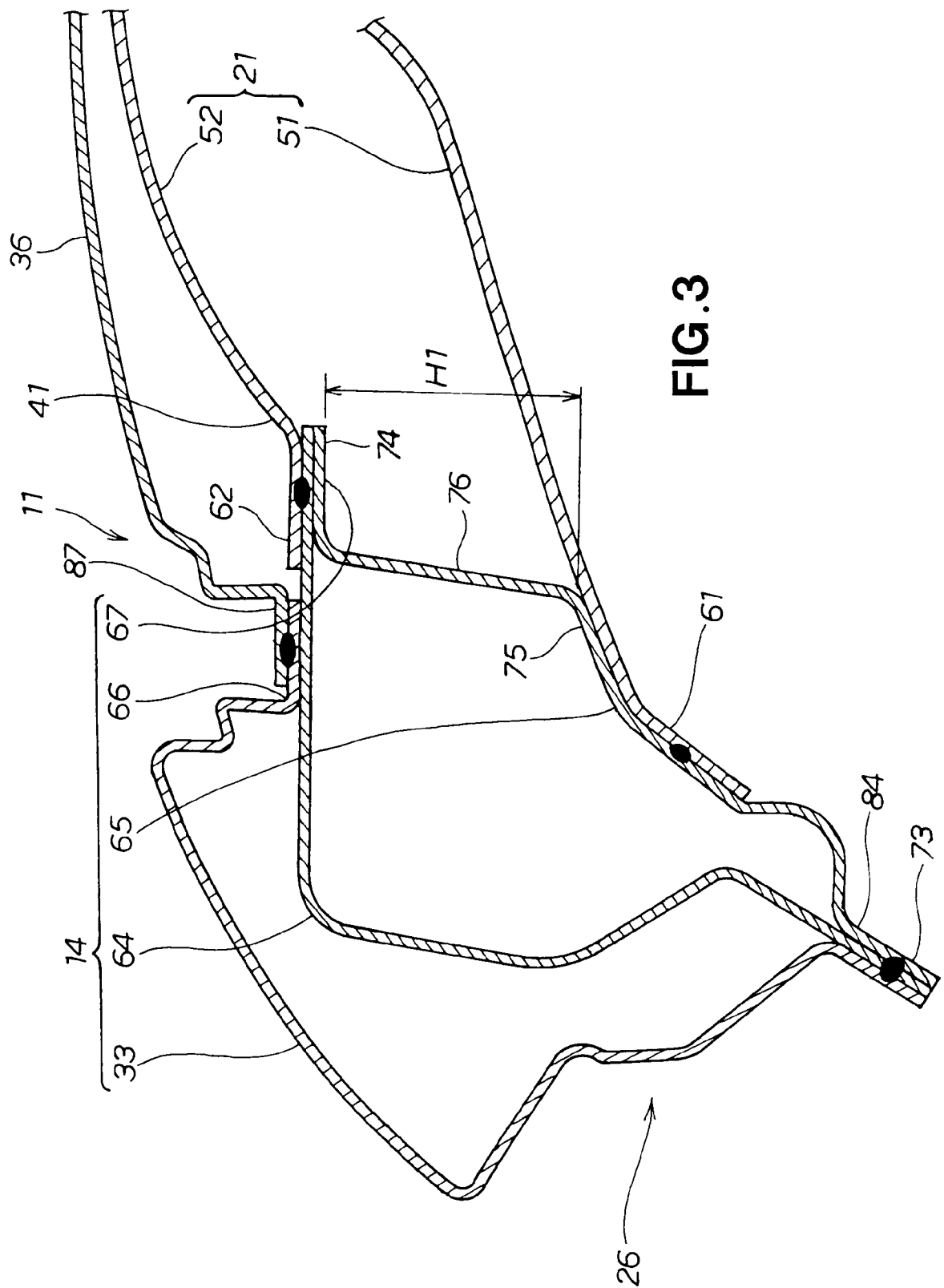
FIG. 3 is a sectional view taken along line 3-3 of FIG. 1.
Figure 4:
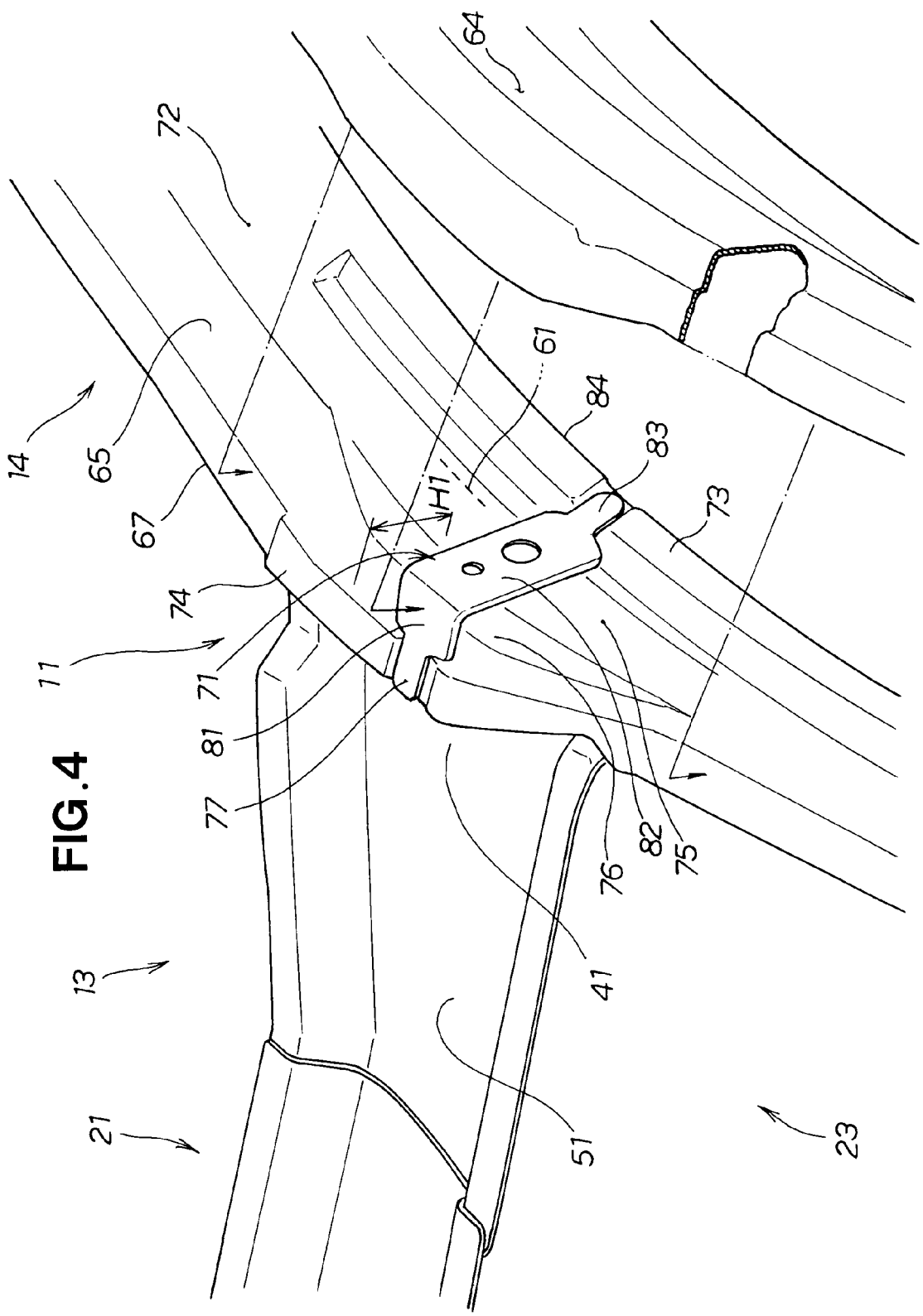
FIG. 4 is a perspective view showing first and second vertical wall portions of the vehicular upper-part structure.

FIG. 3 is a sectional view taken along line 3-3 of FIG. 1, which shows in detail particularly how the front roof rail 21 and the left side roof rail 14 are joined to each other. FIG. 4 is a perspective view showing first and second vertical wall portions of the vehicular upper-part structure.

First inner welding flange portion 61 of the first inner channel-shaped member 51 and first outer welding flange portion 62 of the first outer channel-shaped member 52 are provided on the left end portion 41 of the front roof rail 21.

The left side roof rail 14 includes the outer section 33, an outer member 64, an inner member 65 disposed inwardly of the outer member 64 and extending along and joined to the outer member 64, a two-layer roof panel joint section 66 where the outer section 33 is lapped over the outer member 64, an upper two-layer flange portion 67 where the outer member 64 is lapped over the inner member 65, and the second vertical wall portion 71 in the form of a stay member sandwichingly held in a downwardly recessed portion of the upper two-layer flange portion 67.

The inner member 65 of the left side roof rail 14 includes a body plate 72 having a substantial "I" sectional shape and extending along the roof 13 in a front-rear direction (i.e., Y-axis direction) of the vehicle 12, a door-side welding flange portion 73 formed on the lower edge of the body plate 72, a roof-side welding flange portion 74 formed on the upper edge of the body plate 72, and the first vertical wall portion 76 formed on a front portion 75 of the body plate 72 where the front roof rail 21 is joined to the roof-side welding flange portion 74.

The first vertical wall portion 76 is formed by part of the body plate 72 being bulged toward the front roof rail 21. The first vertical wall portion 76 extends between the first inner welding flange portion 61 and first outer welding flange portion 62 of the front roof rail 21 in substantial orthogonal relation thereto, and the first vertical wall portion 76 has the roof-side welding flange portion 74 integrally formed therewith and extending inwardly at a substantial right angle thereto. The first vertical wall portion 76 has a height H.

As seen in FIG. 4, the stay member 71 constitutes, or provided as, the second vertical wall portion and is disposed between the outer and inner members 64 and 65 of the left side roof rail 14. The stay member 71, which is joined at one end thereof to the roof-side welding flange portion 74, includes: an upper joint section 77 sandwichingly held in the downwardly recessed portion of the upper two-layer flange portion 67 where the outer member 64 is lapped over the inner member 64; a roof backup section 81 formed integrally with the upper joint section 77 so as to abut against the inner surface of the outer member 64; a vertical stay body section 82 formed integrally with the roof backup section 81; and a lower joint section 83 formed integrally with the vertical stay body section 82 and sandwichingly held in a downwardly-and-inwardly recessed portion of a lower two-layer flange portion 84 where the outer member 64 is lapped over the inner member 65.

The vehicular upper-part structure 11 further includes, on each of the opposite sides of the roof 13, an intersecting section where the front pillar, the rood side rail 14 and the roof arch member 21 intersect one another.

Next, a description will be given about behavior of the first embodiment of the vehicular upper-part structure 11 of the present invention. First, the front roof rail 21 is spot-welded to the left side roof rail 14 shown in FIG. 2. In the instant embodiment, the spot-welding is carried out by one electrode being energized while being pressed against mutually-overlapping portions of thin plates with a predetermined pressure; namely, in this case, the mutually-overlapping portions of the thin plates are not sandwichingly pressed between a pair of electrodes.

Figure 5:
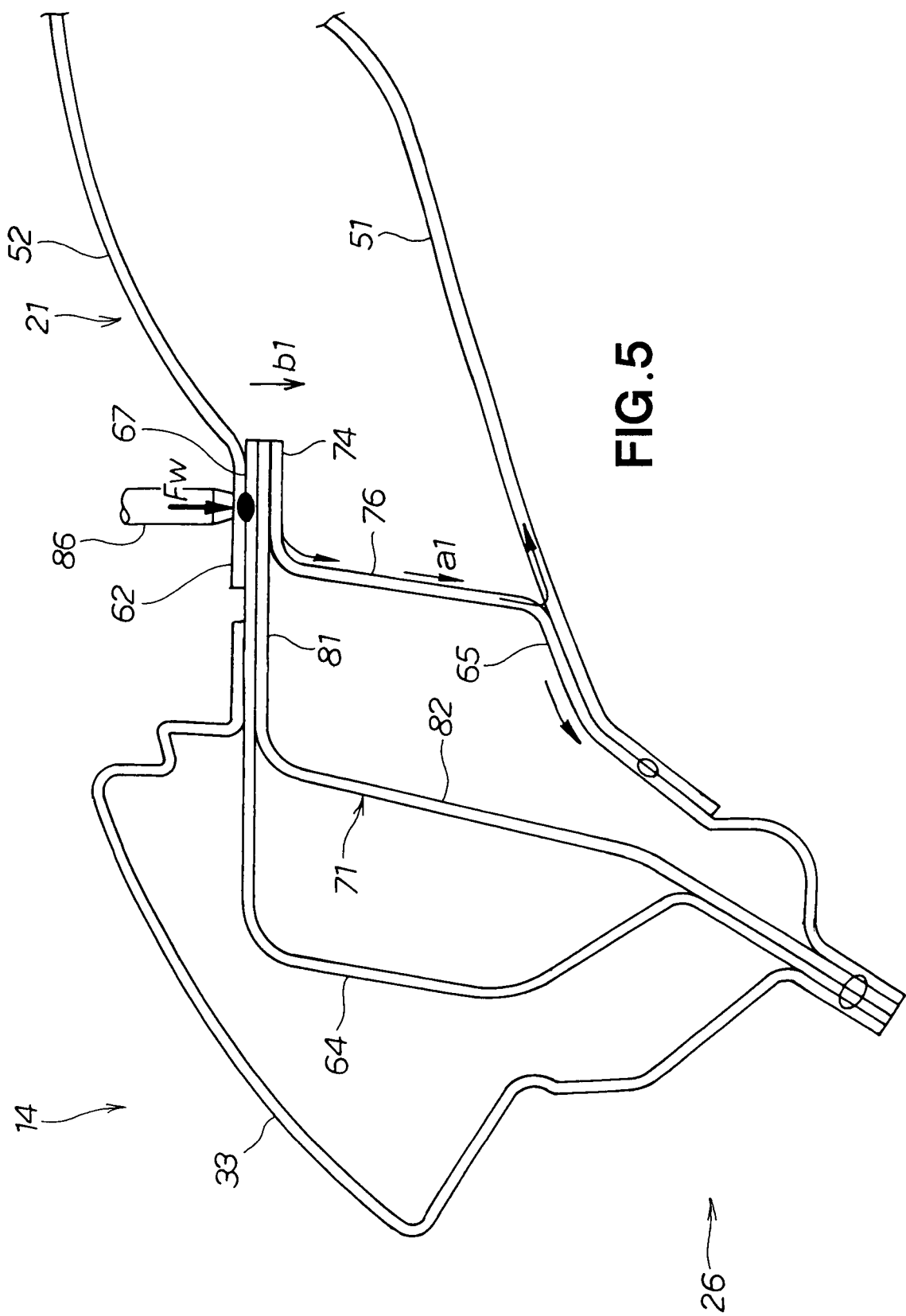
FIG. 5 is a sectional view illustrating a relationship between a side roof rail and a roof arch member (front roof rail) in the vehicular upper-part structure.

FIG. 5 is a sectional view explanatory of relationship between the side roof rail and one of the roof arch members (in this case, front roof rail) in the first embodiment of the vehicular upper-part structure. The relationship will be described with combined reference to FIGS. 2 and 5.

The first outer welding flange portion 62 of the first outer channel-shaped member 52 is lapped over the upper two-layer flange portion 67 of the left side roof rail 14, one welding electrode 86 is pressed against the first outer welding flange portion 62 with a predetermined pressing force Fw, and another electrode (i.e., earth electrode which is not shown) is connected to the vehicle body. The earth electrode used here does not sandwich mutually-overlapping portions to be spot-welded together (i.e., to-be-welded portions) in conjunction with the welding electrode 86.

Figure 6:
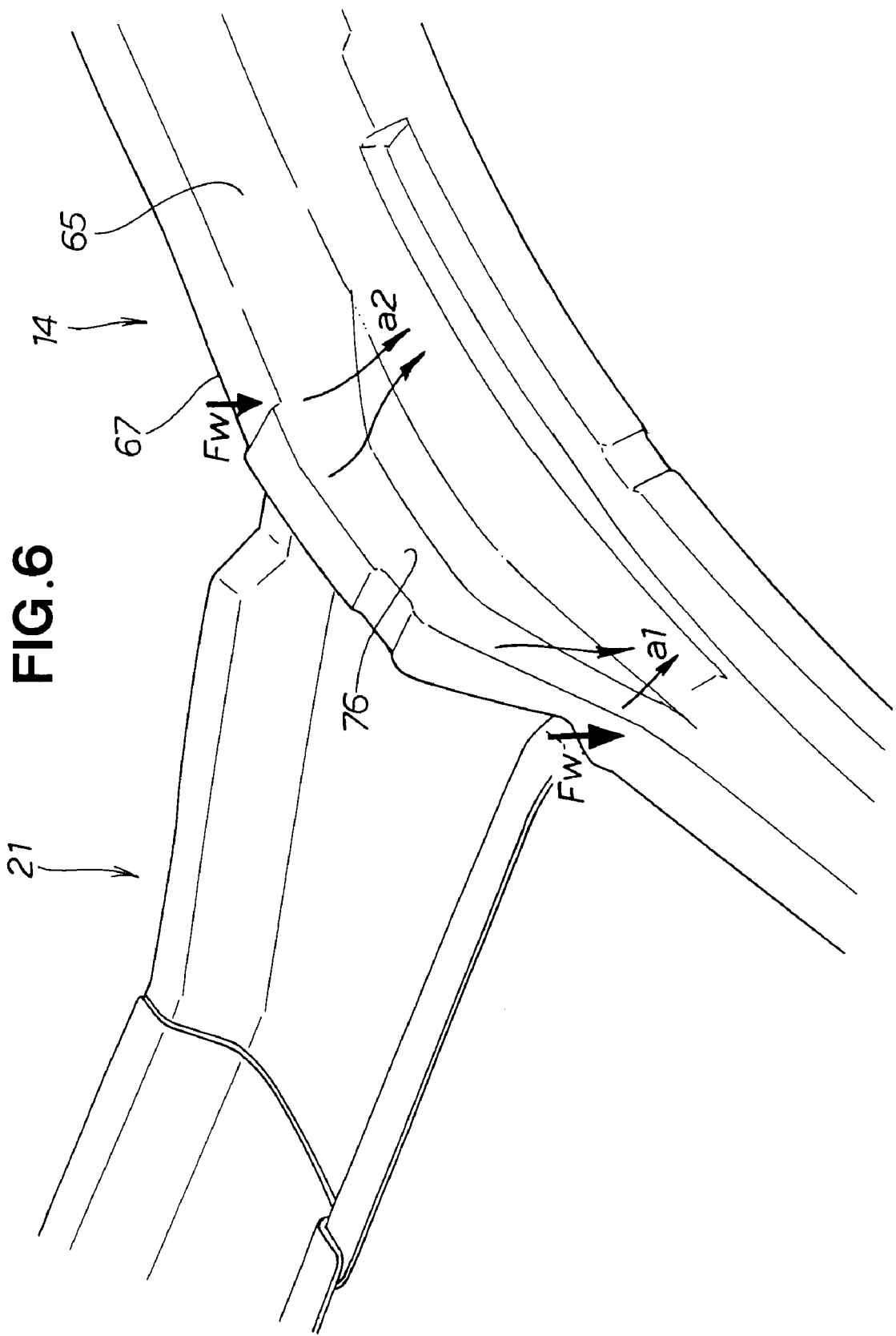
FIG. 6 is a perspective view illustrating a relationship between the side roof rail and the roof arch member (front roof rail) in the vehicular upper-part structure.

FIG. 6 is a perspective view explanatory of relationship between the side roof rail and the roof arch member (front roof rail) in the first embodiment of the vehicular upper-part structure. The relationship will be described with combined reference to FIGS. 5 and 6.

The pressing force Fw applied to the welding electrode 86 (i.e., force with which the welding electrode 86 is pressed) is transmitted to the first vertical wall portion 76, disposed substantially immediately under the welding electrode 86, generally as indicated by arrows a1 and a2, so that it is possible to prevent downward deformation (i.e., deformation in a direction of arrow b1 of FIG. 5) of the upper two-layer flange portion 67 of the left side roof rail 14 and first outer welding flange portion 62 of the front roof rail 21; thus, it is possible to increase the strength of the upper-part structure 11.

Figure 7:
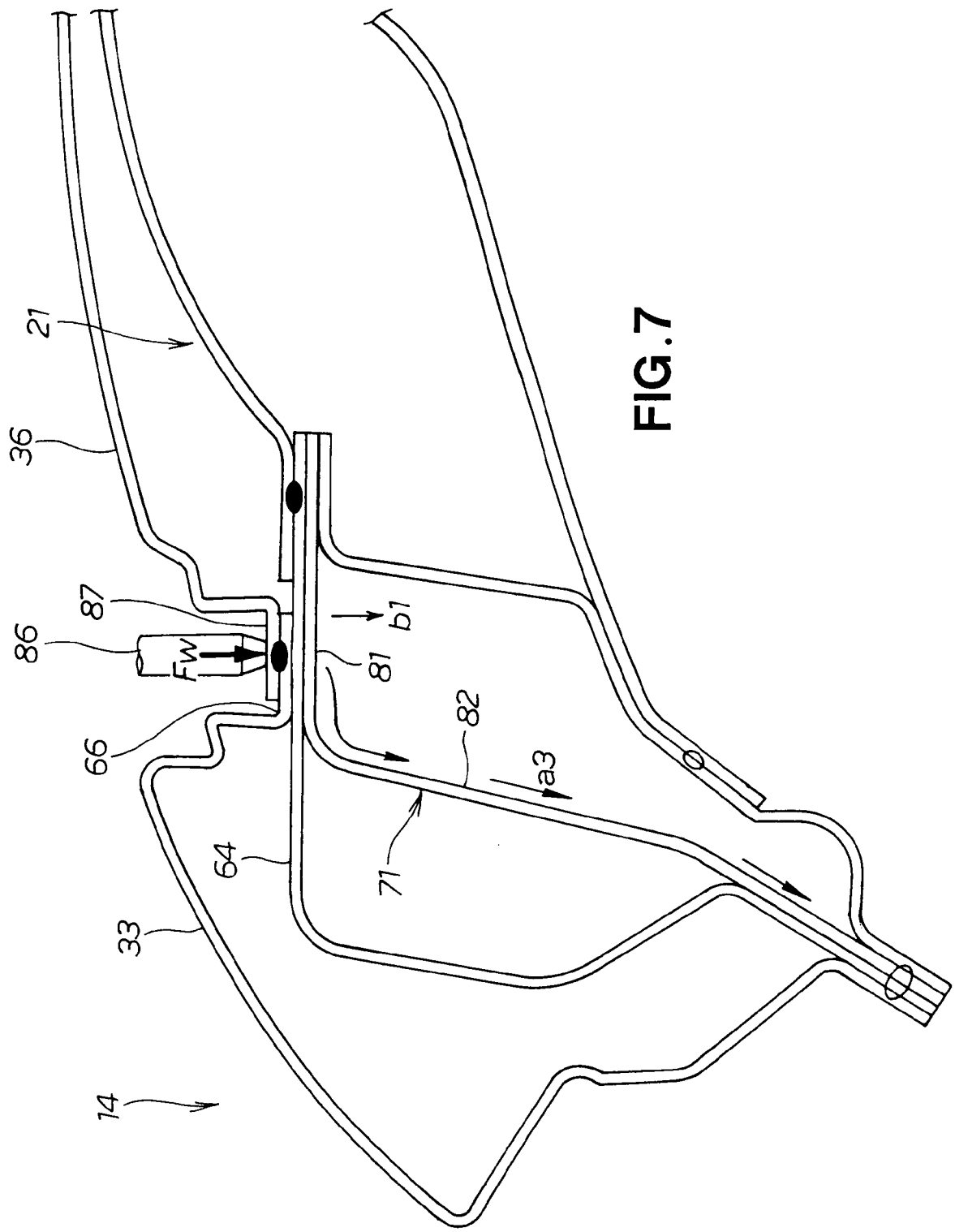
FIG. 7 is a sectional view illustrating of a relationship between the side roof rail and a roof panel in the vehicular upper-part structure.

FIG. 7 is a sectional view explanatory of relationship between the side roof rail and the roof panel in the first embodiment of the vehicular upper-part structure.

The roof panel 36 is spot-welded to the left side roof rail 14. Namely, a welding edge flange portion 87 of the roof panel 36 is lapped over the two-layer roof panel joint section 66 where the outer section 33 is lapped over the outer member 64 of the left side roof rail 14, then the welding electrode 86 is pressed against the flange portion 87 with a predetermined pressing force Fw, and the earth electrode (not shown) is connected to the vehicle body.

Figure 8:
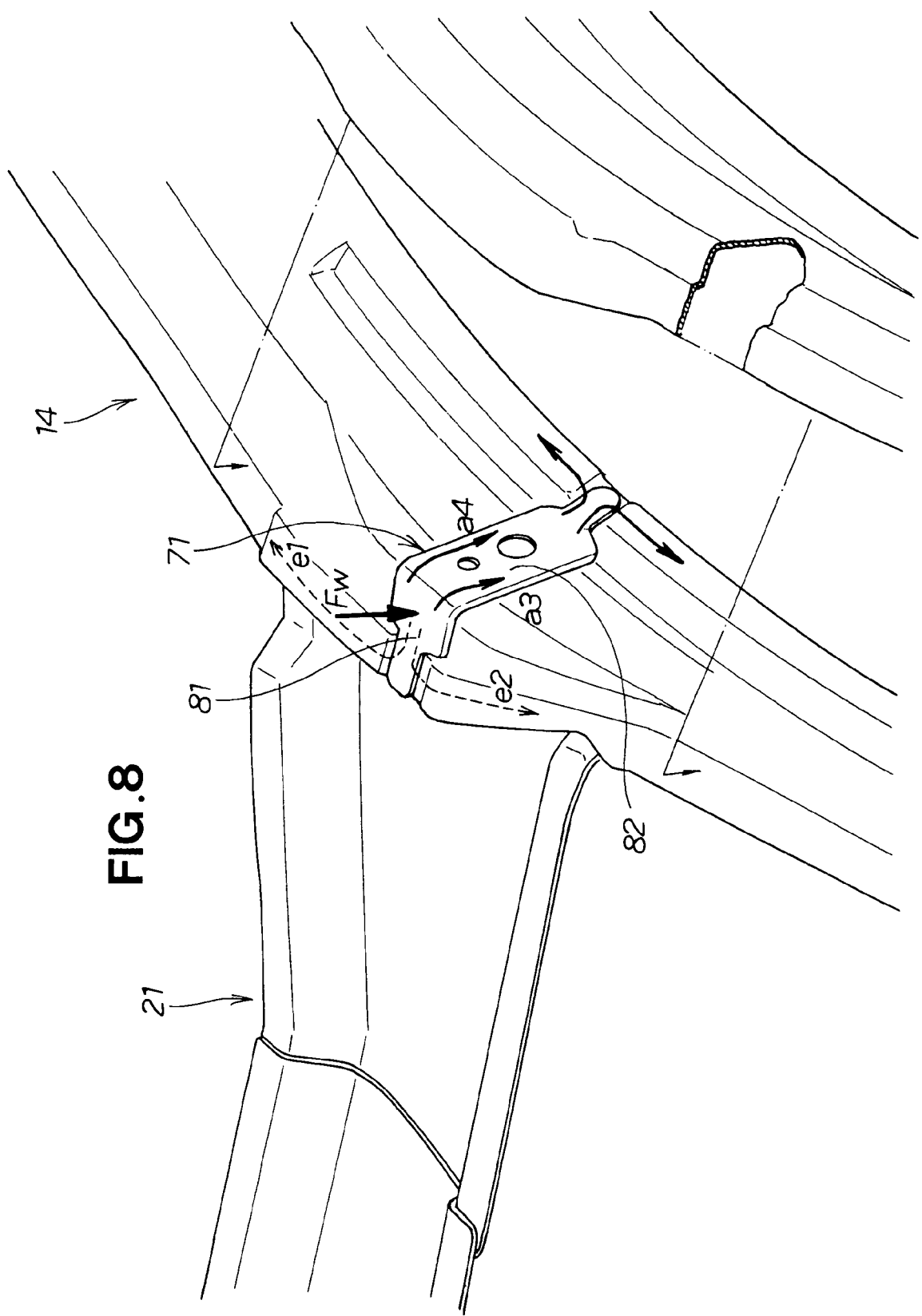
FIG. 8 is a perspective view explanatory of relationship between the side roof rail and the roof panel in the vehicular upper-part structure.

FIG. 8 is a perspective view explanatory of relationship between the side roof rail and the roof panel in the first embodiment of the vehicular upper-part structure. The relationship will be described with combined reference to FIGS. 7 and 8.

The pressing force Fw applied to the welding electrode 86 (i.e., force with which the welding electrode 86 is pressed) is transmitted to the second vertical wall portion 71, disposed substantially immediately under the welding electrode 86, generally as indicated by arrows a3 and a4, so that it is possible to prevent downward deformation (i.e., deformation in the direction of arrow b1) of the two-layer roof panel joint section 66 and welding edge flange portion 87 of the roof panel 36; thus, it is possible to increase the strength of the vehicular upper-part structure 11.

The first vertical wall 76 is subjected to a load caused as the roof panel 36 is joined to the side roof rail 14, and the second vertical wall 71 is subjected to a load caused as the outer section (roof side panel) 33 is joined to the side roof rail.

Because the downward deformation of the upper two-layer flange portion 67 of the left side roof rail 14 and first outer welding flange portion 62 of the front roof rail 21 and the downward deformation of the two-layer roof panel joint section 66 and welding edge flange portion 87 of the roof panel 36 can be prevented via the first and second vertical wall portions 76 and 71 as noted above, the first embodiment of the upper-part structure permits the welding with the welding electrode and flange portions held in reliable close contact with each other, which can achieve stabilization of the welding and reduce undesired variation in welded position.

Further, the first embodiment of the vehicular upper-part structure 11 can effectively disperse forces, other than that applied from the welding electrode 86, by means of the first and second vertical wall portions 76 and 71, and thus it can increase the strength of the vehicle body. Note that an electric current from the welding electrode 86 flows as indicated by arrows e1 and e2.

Figure 9:
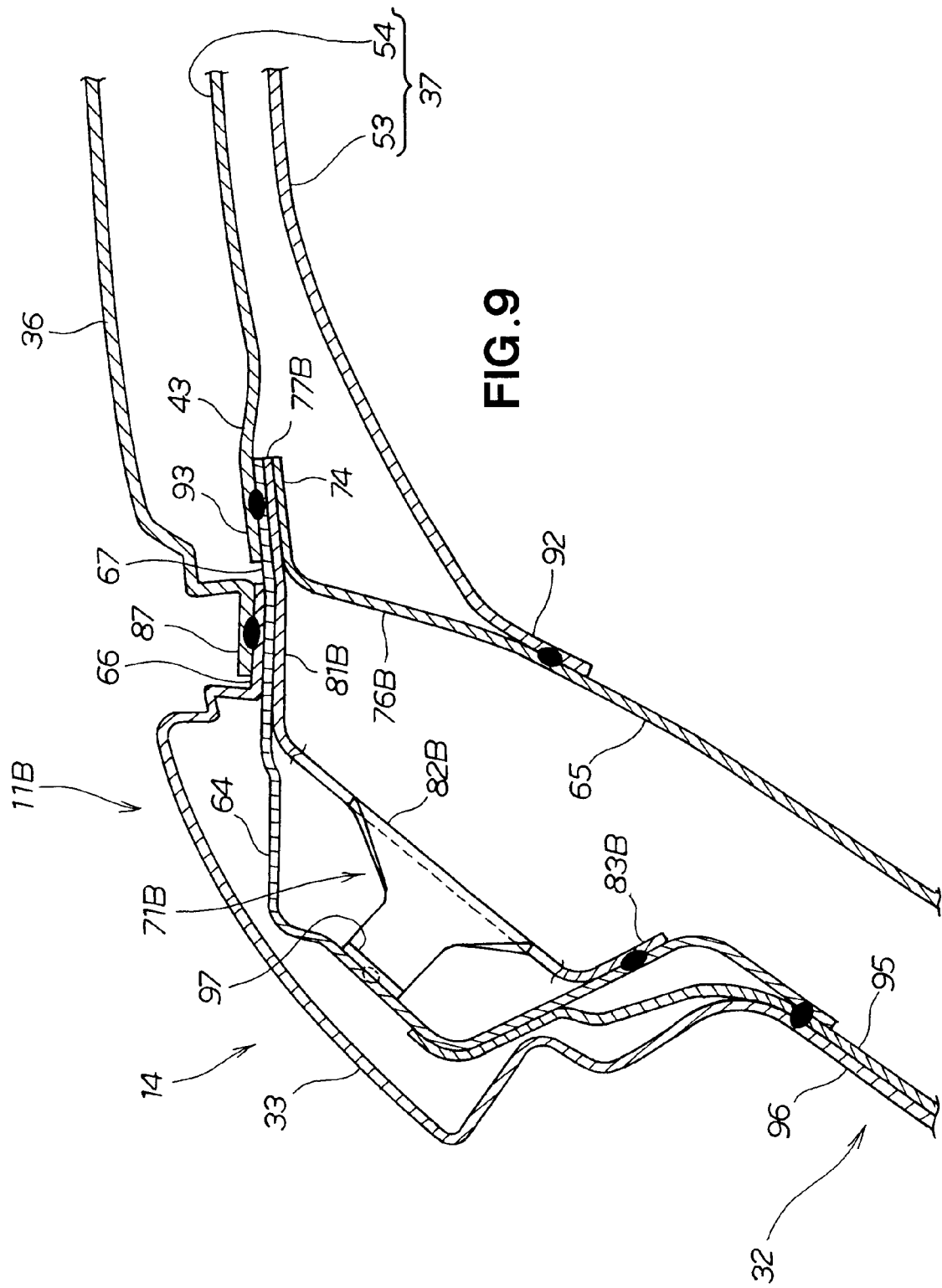
FIG. 9 is a sectional view taken along line 9-9 of FIG. 1, which shows a second embodiment of the vehicular upper-part structure of the present invention.
Figure 10:
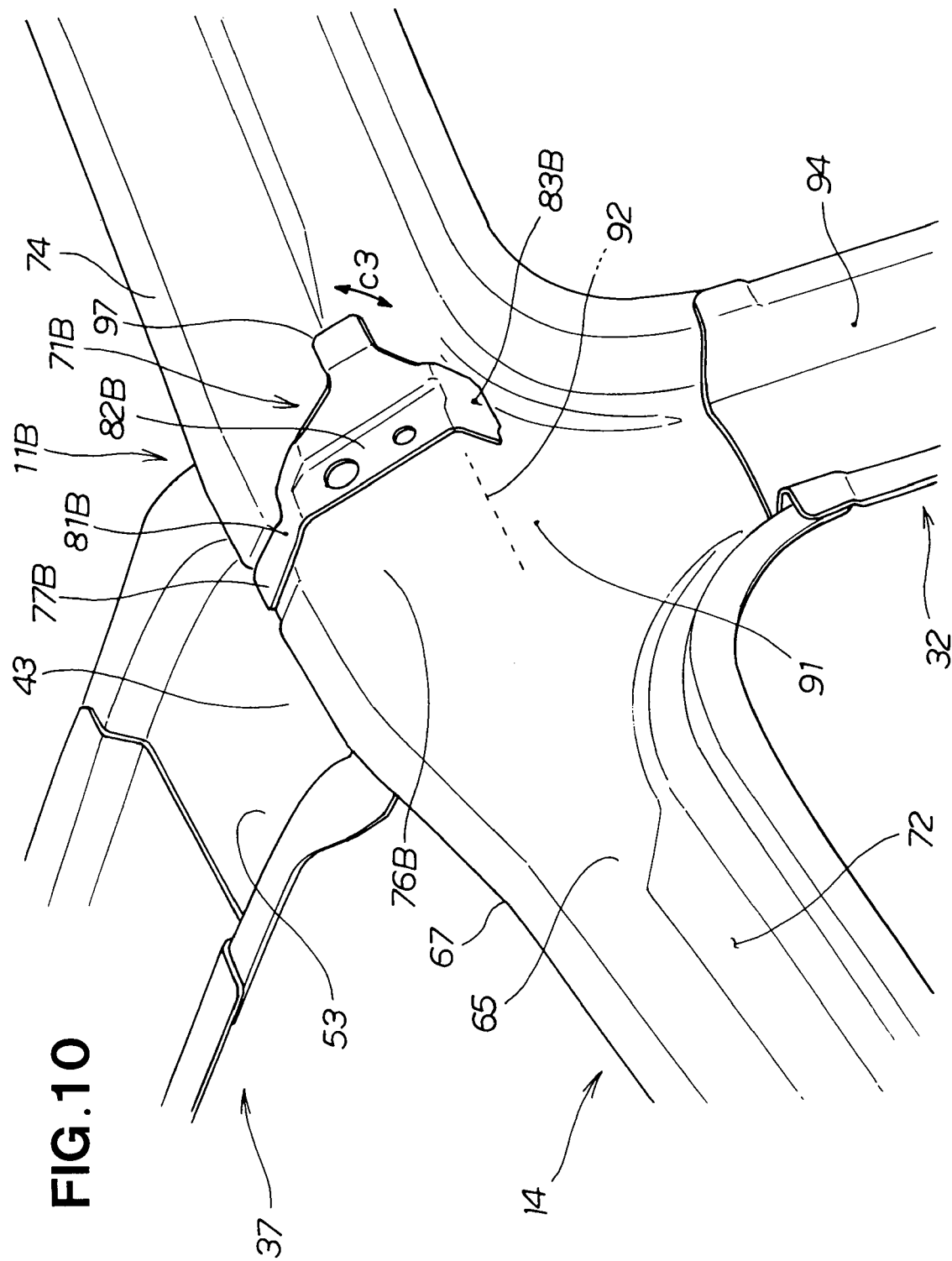
FIG. 10 is an exploded view of the second embodiment of the vehicular upper-part structure.

The following paragraphs describe a second embodiment of the vehicular upper-part structure of the present invention. FIG. 9 is a sectional view taken along line 9-9 of FIG. 1, which shows the second embodiment of the vehicular upper-part structure 11 B. FIG. 10 is an exploded view of the second embodiment of the vehicular upper-part structure 11 B.

The second embodiment of the vehicular upper-part structure 11 B, which has the roof bow 37 joined to the left side roof rail 14, includes a first and vertical wall portion 76 B and a second vertical wall portion (or stay member) 71 B formed on a center joint section 91 to which the roof bow 37 is joined.

Second inner welding flange portion 92 of the second inner channel-shaped member 53 and second outer welding flange portion 93 of the second outer channel-shaped member 54 are formed on the left end portion 43 of the roof bow 37.

The center pillar 32 includes an inner center pillar member 94 joined to the center joint section 91 of the inner member 65, and first and second outer center pillar members 95 and 96 joined to the outer member 64 of the roof rail 14.

The first vertical wall portion 76B is formed by part of the body plate 72 of the inner member 65 being bulged toward the roof bow 37. The first vertical wall portion 76B extends toward the second outer welding flange portion 93 in substantially orthogonal relation thereto, and the first vertical wall portion 76B has the roof-side welding flange portion 74 integrally formed therewith and extending inwardly at a substantial right angle thereto.

The second vertical wall portion (stay member) 71B is disposed between the outer and inner members 64 and 65 of the left side roof rail 14. The second vertical wall portion (stay member) 71B includes: an upper joint section 77B sandwichingly held in a downwardly recessed portion of the upper two-layer flange portion 67 where the outer member 64 is lapped over the inner member 64; a roof backup section 81B formed integrally with the upper joint section 77B so as to abut against the inner surface of the outer member 64; a vertical stay body section 82B formed integrally with the roof backup section 81B; and a lower joint section 83B formed integrally with the vertical stay body section 82B and joined to the outer member 64. The vertical stay body section 82B has a center joint leg portion 97 formed thereon so as to abut against the inner surface of the outer member 64.

Figure 11:
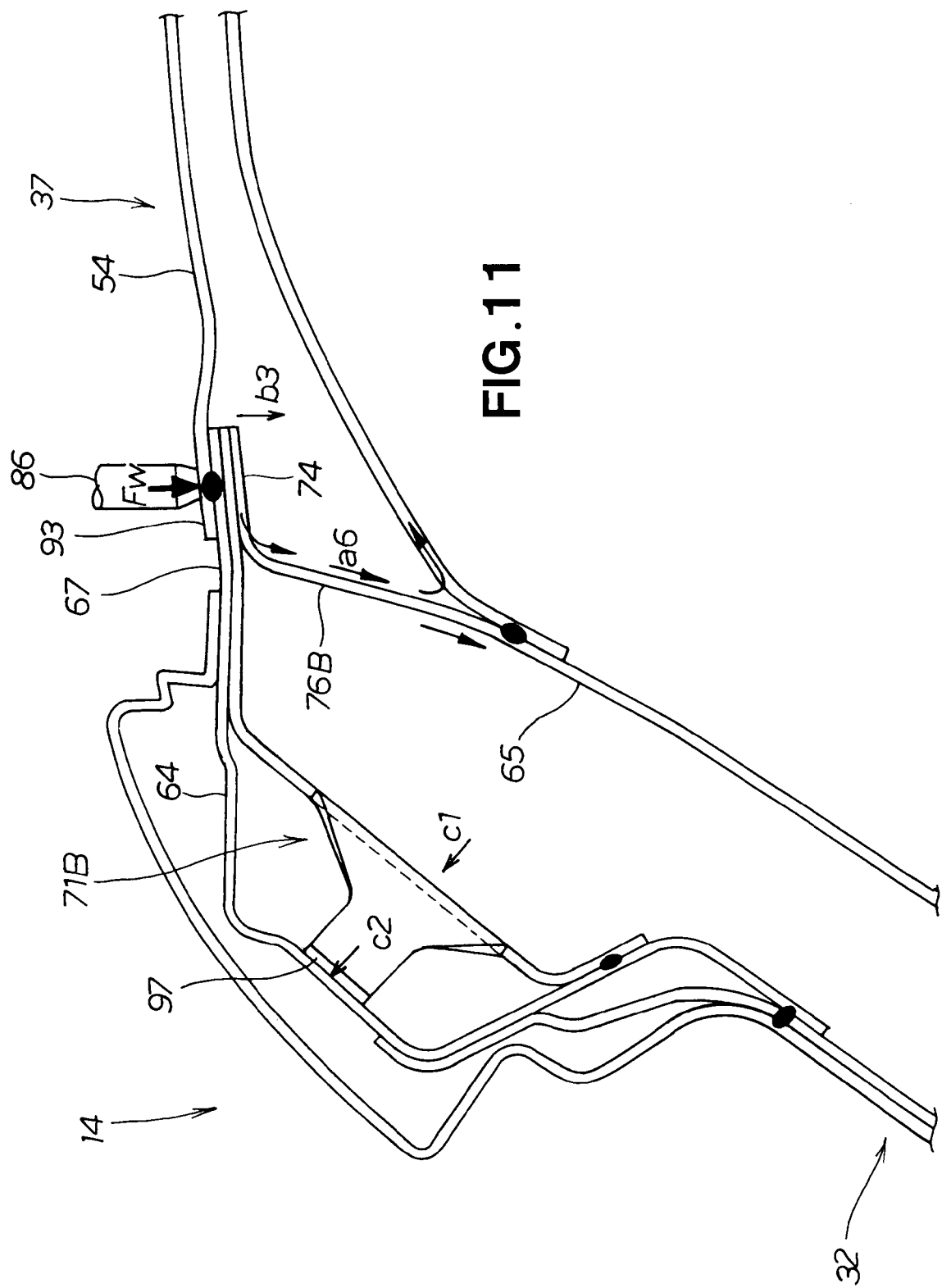
FIG. 11 is a sectional view showing a relationship between the side roof rail and another roof arch member (roof bow) in the second embodiment of the vehicular upper-part structure.

Next, a description will be given about behavior of the second embodiment of the vehicular upper-part structure 11B of the present invention. FIG. 11 is a sectional view showing relationship between the side roof rail and the roof arch member (in this case, roof bow 37) in the second embodiment of the vehicular upper-part structure 11B, and the relationship will be described with combined reference to FIGS. 2 and 11.

The roof bow 37 is spot-welded to the left side roof rail 14 shown in FIG. 2. Namely, the second outer welding flange portion 93 of the roof bow 37 is lapped over the upper two-layer flange portion 67 of the left side roof rail 14, then the welding electrode 86 is pressed against the second outer welding flange portion 93 with a predetermined pressing force Fw, and the earth electrode (not shown) is connected to the vehicle body.

The pressing force Fw applied to the welding electrode 86 (i.e., force with which the welding electrode 86 is pressed) is transmitted substantially directly to the first vertical wall portion 76B, disposed substantially immediately under the welding electrode 86, generally as indicated by arrow a6, so that it is possible to prevent downward deformation (i.e., deformation in a direction of arrow b3) of the upper two-layer flange portion 67 of the left side roof rail 14 and second outer welding flange portion 93 of the roof bow 37; thus, it is possible to increase the strength of the vehicular upper-part structure 11.

Figure 12:
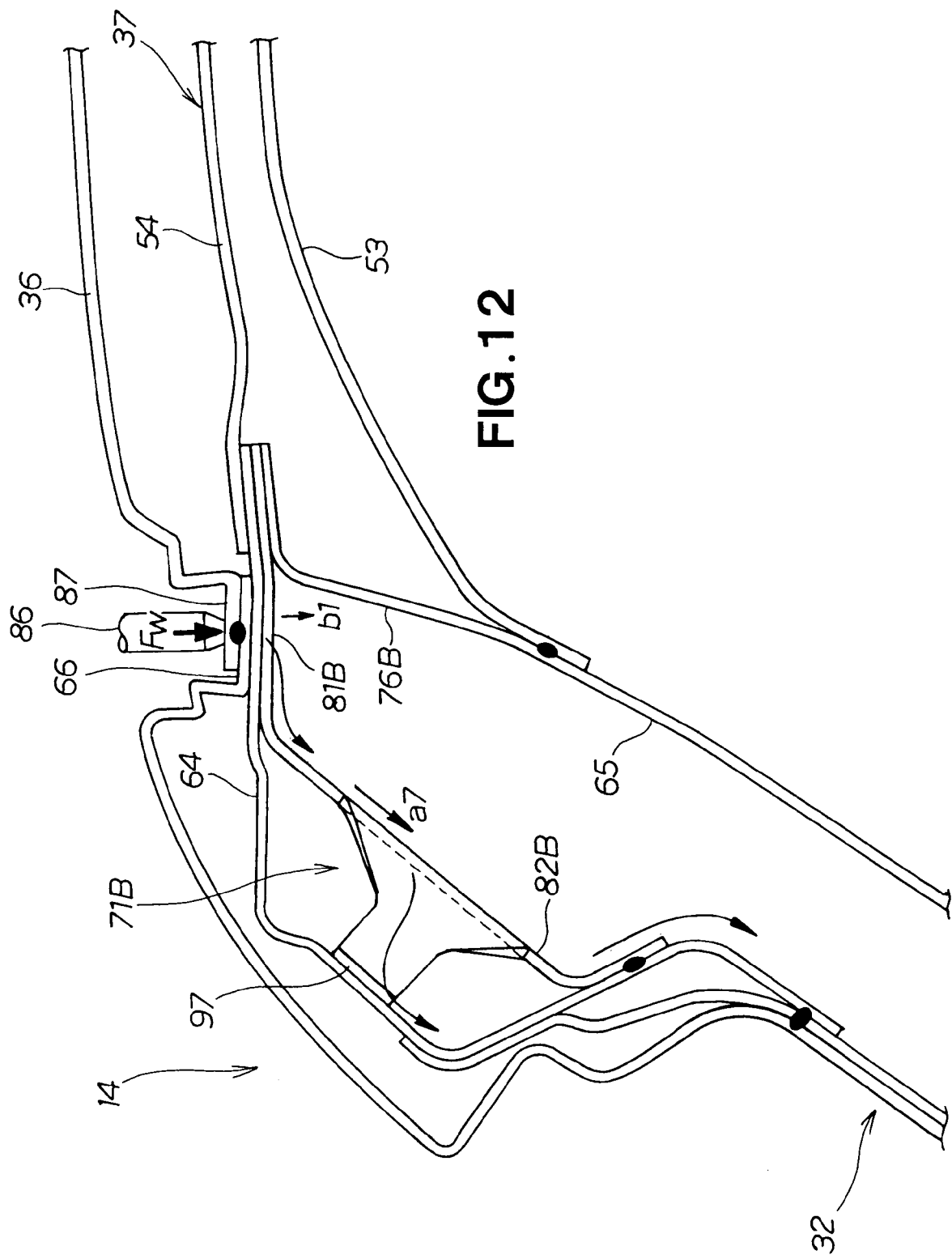
FIG. 12 is a sectional view showing a relationship between the side roof rail and the roof panel in the second embodiment of the vehicular upper-part structure.

FIG. 12 is a sectional view showing relationship between the side roof rail and the roof panel in the second embodiment of the vehicular upper-part structure 11B, and the relationship will be described with combined reference to FIGS. 2 and 12.

The roof panel 36 is spot-welded to the left side roof rail 14 shown in FIG. 2. The welding edge flange portion 87 of the roof panel 36 is lapped over the two-layer roof panel joint section 66 where the outer section 33 is lapped over the outer member 64 of the left side roof rail 14, then the welding electrode 86 is pressed against the flange portion 87 with a predetermined pressing force Fw, and the earth electrode (not shown) is connected to the vehicle body.

The pressing force Fw applied to the welding electrode 86 (i.e., force with which the welding electrode 86 is pressed) is transmitted substantially directly to the second vertical wall portion 71B, disposed substantially immediately under the welding electrode 86, generally as indicated by arrow a7, so that it is possible to prevent downward deformation (i.e., deformation in the direction of arrow b1) of the two-layer roof panel joint section 66 of the left side roof rail 14 and welding edge flange portion 87 of the roof panel 36; thus, it is possible to increase the strength of the vehicular upper-part structure 11B.

The first vertical wall 76B is subjected to a load caused as the roof panel 36 is joined to the side roof rail 14, and the second vertical wall 71 is subjected to a load caused as the outer section (roof side panel) 33 is joined to the side roof rail.

Because the downward deformation can be prevented via the first and second vertical wall portions 76B and 71B as noted above, the second embodiment of the upper-part structure 11B permits the welding with the welding electrode and flange portions held in reliable close contact with each other, which can achieve stabilization of the welding and reduce undesired variation in welded position.

Further, when the second vertical wall portion (stay member) 71B shown in FIGS. 10 and 11 is provisionally set in position as indicated by arrow c1 for welding to the inner surface of the outer member 64, the center joint leg portion 97 abuts against the inner surface of the outer member 64 as indicated by arrow c2, and thus, the second vertical wall portion (stay member) 71B can be automatically positioned and effectively prevented from pivoting in a direction of arrow c3 of FIG. 10.

Furthermore, with the center joint leg portion 97 fixedly joined to the inner surface of the outer member 64, it is possible to increase the mechanical strength of the second vertical wall portion (stay member) 71B.

The present invention may either employ only the first or second embodiment of the vehicular upper-part structure, or a combination of the first and second embodiments of the vehicular upper-part structure as illustrated in FIGS. 1 and 2.

INDUSTRIAL APPLICABILITY

The vehicular upper-part structure of the present invention is particularly suited for use in side roof rails of vehicles.

The invention claimed is:

1. A vehicular upper-part structure comprising: side roof rails disposed on opposite sides of a roof of a vehicle compartment; and a roof panel and roof arch member each joined at opposite end portions thereof to said side roof rails, each of said side roof rails comprising:
an outer member;
an inner member extending along the outer member, said inner member having a first vertical wall portion and a welding flange portion formed integrally with said first vertical wall portion, one of the opposite end portions of said roof arch member being joined by welding to the welding flange portion; and
a second vertical wall portion in a form of a stay member that has one end portion joined to said welding flange portion of said inner member and supports a roof panel joint section having one of the opposite end portions of the roof panel joined thereto by welding.

2. The vehicular upper-part structure of claim 1, wherein said first vertical wall is subjected to a load caused as the roof panel is joined to said side roof rail.

3. The vehicular upper-part structure of claim 1, wherein said second vertical wall is subjected to a load caused as a roof side panel is joined to said side roof rail.

4. The vehicular upper-part structure of claim 1, which further includes, on each of the opposite sides of the roof, an intersecting section where a front pillar, the rood side rail and the roof arch member intersect one another.

* * * * *